United States Patent
Dong et al.

(10) Patent No.: US 9,684,634 B2
(45) Date of Patent: Jun. 20, 2017

(54) METHOD AND APPARATUS FOR EVALUATING PREDICTIVE MODEL

(71) Applicant: International Business Machines Corporation, Armonk, NY (US)

(72) Inventors: Wei S. Dong, Beijing (CN); Chunhua Tian, Beijing (CN); Yu Wang, Beijing (CN); Yu Wang, Shanghai (CN); Junchi Yan, Shanghai (CN); Chao Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 14/314,308

(22) Filed: Jun. 25, 2014

(65) Prior Publication Data

US 2015/0039540 A1 Feb. 5, 2015

(30) Foreign Application Priority Data

Jul. 31, 2013 (CN) .......................... 2013 1 0329078

(51) Int. Cl.
*G06F 17/18* (2006.01)
*G06Q 10/06* (2012.01)
*G06K 9/62* (2006.01)

(52) U.S. Cl.
CPC ........... *G06F 17/18* (2013.01); *G06K 9/6262* (2013.01); *G06Q 10/06375* (2013.01)

(58) Field of Classification Search
None
See application file for complete search history.

(56) References Cited

U.S. PATENT DOCUMENTS

| 8,417,715 | B1 | 4/2013 | Bruckhaus et al. |
| 8,533,224 | B2 * | 9/2013 | Lin ........................... G06N 3/08 707/771 |
| 8,762,299 | B1 * | 6/2014 | Breckenridge ......... G06F 15/18 706/12 |
| 2006/0161403 | A1 * | 7/2006 | Jiang ...................... G06F 17/18 703/2 |
| 2010/0153332 | A1 | 6/2010 | Rollins et al. |
| 2013/0132331 | A1 | 5/2013 | Kowalczyk et al. |

OTHER PUBLICATIONS

Chinese Application No. 201310329078.3 filed on Jul. 31, 2013.

* cited by examiner

*Primary Examiner* — Alan Chen
(74) *Attorney, Agent, or Firm* — Maeve Carpenter (57) ABSTRACT

In an approach for evaluating a predictive model, a computer identifies features of training samples in a set of training samples and selects at least one evaluation metric from a set of evaluation metrics as one or more available metrics based on the identified features. The computer applies a predictive model created based on the set of training samples to a set of test samples so as to calculate values of the one or more available metrics and evaluates the predictive model by using the one or more available metrics and the values of the available metrics. With the technical solutions described with respect to the embodiments of the present invention, one or more evaluation metrics that are applicable to specific training sample features may be determined from several evaluation metrics, so that users can precisely evaluate predictive models by using the determined evaluation metrics.

18 Claims, 11 Drawing Sheets

| Area | Vocation | Age | Monthly Income | Monthly Average Consumption | Sex | WIFI Business | Average Monthly Long-Distance Fee | Package Model | Service Time | Label Churned or not |
|---|---|---|---|---|---|---|---|---|---|---|
| 2 | 13 | 44 | 3200 | 74 | 0 | 0 | 7.5 | 2 | 7.5 | 1 |
| 3 | 11 | 33 | 6800 | 88 | 0 | 1 | 15.25 | 6 | 15.25 | 1 |
| 3 | 68 | 52 | 5800 | 363 | 1 | 0 | 30.25 | 2 | 30.25 | 0 |
| 2 | 33 | 33 | 1650 | 189 | 1 | 0 | 0 | 1 | 0 | 1 |
| 2 | 23 | 30 | 1500 | 126 | 0 | 0 | 0 | 4 | 0 | 0 |
| 2 | 41 | 39 | 3900 | 236 | 1 | 0 | 13.5 | 1 | 13.5 | 0 |
| 3 | 45 | 22 | 950 | 218 | 1 | 0 | 8.75 | 5 | 8.75 | 1 |
| 2 | 38 | 35 | 3800 | 121 | 0 | 1 | 23.25 | 3 | 23.25 | 0 |
| 3 | 45 | 59 | 8300 | 195 | 0 | 0 | 12 | 5 | 12 | 0 |
| 1 | 68 | 41 | 3600 | 483 | 0 | 0 | 16.5 | 3 | 16.5 | 0 |
| 2 | 5 | 33 | 6250 | 97 | 1 | 0 | 0 | 1 | 0 | 1 |
| 3 | 7 | 35 | 4000 | 142 | 1 | 0 | 23.75 | 1 | 23.75 | 0 |
| ... | ... | ... | ... | ... | ... | ... | ... | ... | ... | ... |

Table 1

Fig. 7

|  | Type of Samples | Type of Data Mining Tasks | Requirement on Ratio between Inter-Classification Samples |
|---|---|---|---|
| AUC | Static | Bi-classification | No |
| Accuracy | Static | Any | Yes (>1/3) |
| F-score | Any | Bi-classification | No |
| Recall | Any | Bi-classification | No |
| Precision | Any | Bi-classification | No |
| MAUC | Static | Multi-classification | No |
| Cohesion | Any | Clustering | Sensitive |
| Sum of Squares Error | Time series | Clustering | No |
| Predictor Importance | Any | Any | No |
| ... | ... | ... | ... |

Table 2

Fig. 8

|  |  | Precisely Predicated | Falsely Predicated |  |
|---|---|---|---|---|
|  |  | 1 | 0 | Sum |
| Positive Samples (customers who will stop to use competitors' products) | 1 | True Positive (TP) | False Positive (NP) | Predicated to be Positive (TP+FP) |
| Negative Sample (customers who will continue using the present company's products) | 0 | False Negative (FN) | True Negative (TN) | Predicated to be Negative (FN+TN) |
| Sum |  | Actual Positive (TP+FN) | Actually Negative (FP+TN) | TP+FP+FN+TN |

Table 3

Fig. 9

| Application Industry | Communications | | | Banking | | ... |
|---|---|---|---|---|---|---|
| Application Scenario | Base Station Failure | Customer Analysis | ... | Credit Risk | ... | ... |
| AUC | 0.7 | 0.9 | ... | ... | ... | ... |
| Accuracy | 0.3 | 0.1 | ... | ... | ... | ... |
| F-score | 0.4 | 0.7 | ... | ... | ... | ... |
| Recall | 0.4 | 0.6 | ... | ... | ... | ... |
| Precision | 0.5 | 0.6 | ... | ... | ... | ... |
| MAUC | 0 | 0 | ... | ... | ... | ... |
| Cohesion | 0 | 0 | ... | ... | ... | ... |
| Sum of Squares Error) | 0 | 0 | ... | ... | ... | ... |
| Predictor Importance | 0 | 0 | ... | ... | ... | ... |
| ... | ... | ... | ... | ... | ... | ... |

Table 4

Fig. 10

| Second User-Preferred Metrics | Weight |
|---|---|
| F-score | 0.9 |
| AUC | 0.3 |
| Recall | 0.6 |

Table 5

Fig. 11

METHOD AND APPARATUS FOR EVALUATING PREDICTIVE MODEL

FIELD OF THE INVENTION

Embodiments of the present invention relate to the data mining field, and more specifically, to a method and apparatus for evaluating a predictive model.

BACKGROUND OF THE INVENTION

Data mining (DM), also termed knowledge discovery in database (KDD), is a hot issue of research in the current artificial intelligence and database field. The data mining refers to a process of discovering from huge data of database implicit, previously unknown and potentially valuable information. Generally, the data mining is the process of automatically searching in huge data for information having special relationships (belonging to association rule learning) and hidden therein. The data mining is usually associated with computer science and accomplishes the objects as described above by means of such as statistics, online analysis processing, information retrieval, machine learning, expert system (relying on past rules of thumb), and pattern recognition.

Various data mining platforms have been developed so far, by which predictive models can be created rapidly and applied to industries so as to help decision-makers to make correct decisions. Manifestation forms of predictive models may include rule sets, mathematical formulas, decision trees, etc, which may be used to generate prediction results according to a group of inputs or variables. After creating a predictive model, performance (precision) of the predictive model needs to be evaluated by using evaluation metrics, so as to ensure precision of the generated prediction results.

There exist various metrics for evaluating predictive models, such as receiver operating area under curve (AUC), accuracy, F-score, recall, precision, etc. However, data flow platforms that have been developed can only provide such an evaluation metric as accuracy. In some cases, for example with respect to unbalanced samples, the metric "accuracy" is not sufficient to reflect performance of the created predictive model. Therefore, it is a research focus in the current data mining field regarding how to determine from multiple evaluation metrics one or more suitable evaluation metrics for evaluating a predictive model.

SUMMARY OF THE INVENTION

In a first aspect, embodiments of the present invention provide a method for evaluating a predictive model. The method comprises: identifying, by one or more computer processors, features of training samples in a set of training samples; selecting, by one or more computer processors, at least one evaluation metric from a set of evaluation metrics as one or more available metrics based on the identified features; applying, by one or more computer processors, a predictive model created based on the set of training samples to a set of test samples so as to calculate values of the available metrics; and evaluating, by one or more computer processors, the predictive model by using the available metrics and the values of the available metrics.

In a second aspect, embodiments of the present invention provide an apparatus for evaluating a predictive model. The apparatus comprises: one or more computer processors; one or more computer readable storage media; program instructions stored on the one or more computer readable storage media for execution by at least one of the one or more computer processors, the program instructions comprising: an identifying module configured to identify features of the training samples in a set of training samples; a selecting module configured to select at least one evaluation metric from a set of evaluation metrics as one or more available metrics based on the identified features; a calculating module configured to apply a predictive model created based on the set of training samples to a set of test samples so as to calculate values of the available metrics; and an evaluating module configured to evaluate the predictive model by using the available metrics and the values of the available metrics.

With the technical solutions described with respect to the various embodiments of the present invention, one or more evaluation metrics that are applicable to specific training sample features (e.g. a type of training samples and a type of a data mining task to which the training samples are directed) may be determined from several evaluation metrics, so that users can precisely evaluate predictive models by using the determined evaluation metrics.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
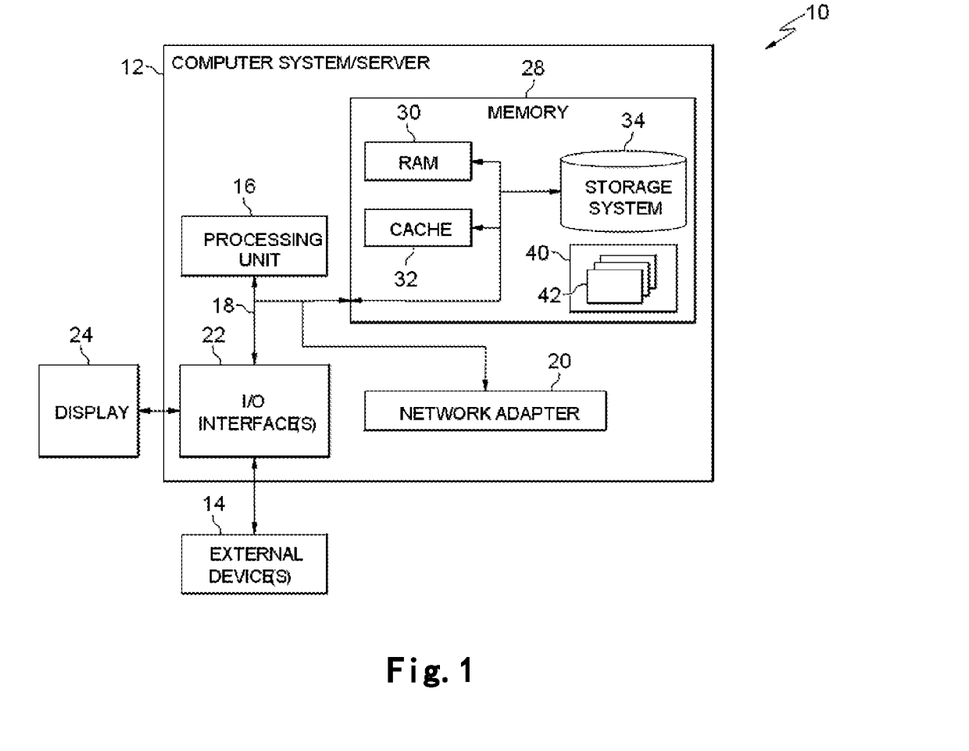
FIG. 1 schematically shows a block diagram of an exemplary computer system which is applicable to implement embodiments of the present invention.

Referring now to FIG. 1 and computer 10, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
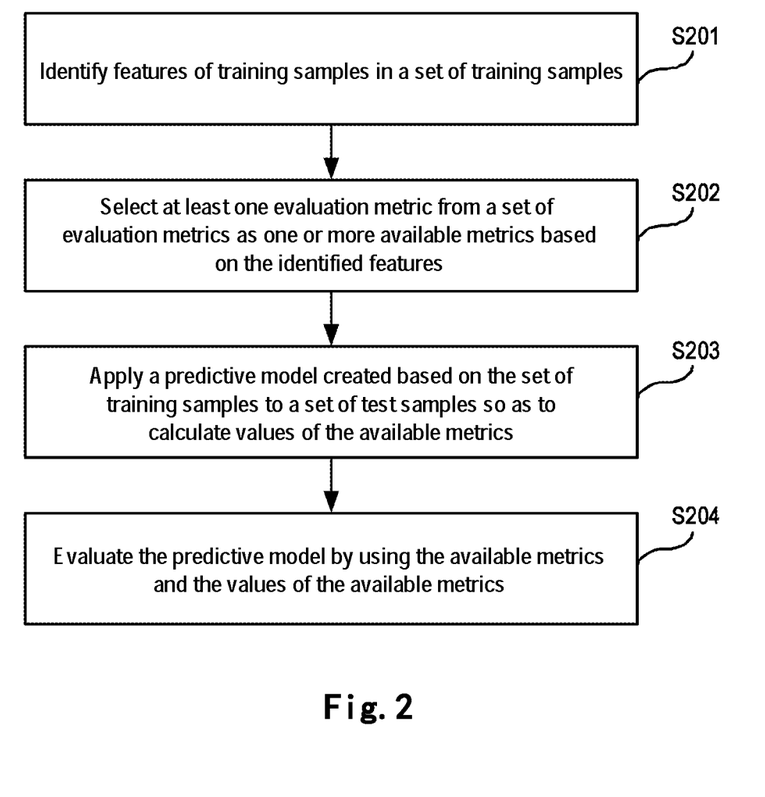
FIG. 2 schematically shows a flowchart of a method for evaluating a predictive model according to an embodiment of the present invention.

FIG. 2 shows a flowchart of a method for evaluating a predictive model according to an embodiment of the present invention. The predictive model to be evaluated may be created by using any data mining platform that is currently available on markets. When a predictive model is created, a set of samples may be divided into two portions: a set of samples with known prediction results and a set of samples with unknown prediction results. In the field of data mining, typically, the set of samples with known prediction results is referred to as a set of training samples, while the set of samples with unknown prediction results is referred to as a set of test samples. Then, a data mining algorithm is applied to the set of training samples for creating a predictive model.

Hereinafter, there is provided a brief description of the process of creating a predictive model with reference to a specific example. In this example, a telecommunications service provider is concerned about the amount of customers that will churn to competitors. If customers who possibly churn to other providers can be predicted by using service usage data, they may be retained as much as possible by customizing service usage data.

Figure 7:
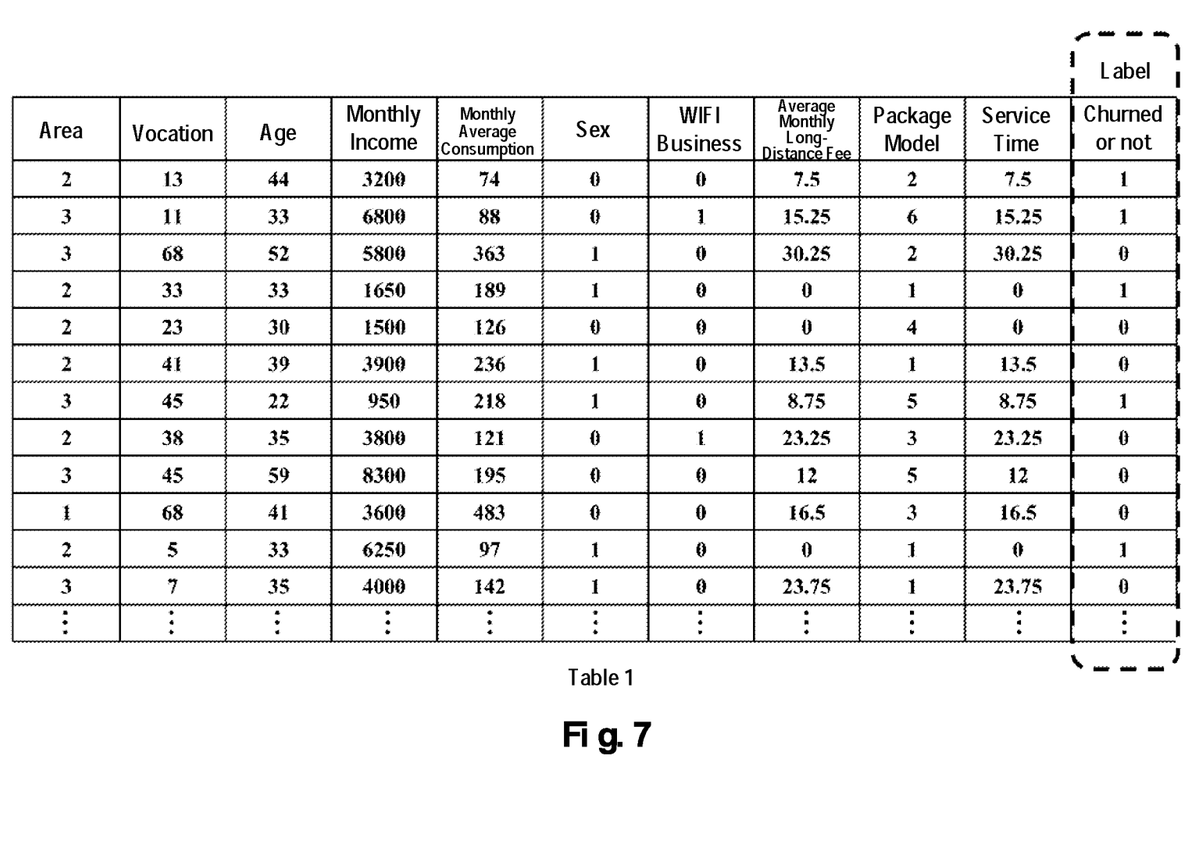
FIG. 7 depicts Table 1 showing an exemplary set of samples in an embodiment of the present invention.

The telecommunications service provider has material and historical usage information for 100,000 customers, and then a set of samples may be built by using the material and historical usage information for these customers, as shown by Table 1 in FIG. 7.

The set of samples may be randomly divided into two portions: a set of training samples (containing material and historical usage information for 80,000 customers) and a set of test samples (containing material and historical usage information for 20,000 customers). Then, on a data mining platform, a logistic regression training method is applied to the set of training samples so as to create a logistic regression model. The logistic regression model may be defined as below: given several marked samples, each of which has attribute information [x1, x2, . . . , xn] and corresponding mark information y, the logistic regression model learns a function y=f([x1, x2, . . . , xn]) so that fitting error of these samples is minimized. Here, y is discrete-valued, and x1, x2, . . . , xn may be either discrete values or continuous values. In performing a customer churn analysis, each customer may be regarded as a sample. Regarding previous customers, it can be known who are renewed and who are not renewed (churned). Renewal or not is represented by y in the logistic regression with a discrete value of "churned" or "non-churned". Each customer has information such as area, vocation, age, monthly income, average monthly consumption, sex, WIFI business, average monthly long-distance fee, service time, etc., just as shown by Table 1 in FIG. 7. The information is represented by [x1, x2, x3 . . . , xn]. That is, each x corresponds to an attribute. Information for these customers is used as x, and a result indicating renewal or not is used as y; then, these <x,y> pairs are used as inputs to the predictive model, whereby a corresponding function f is trained such that total error of f(x) and y for all samples is minimized.

It should be understood that although a predictive model has been described in detail by taking as an example a logistic regression model used for customer churn analyses in the telecommunications sector, based on different applications of predictive models, the method for evaluating a predictive model according to the embodiments of the present invention is not limited thereto, but may be applied to other industries than telecommunications, and also may be aimed at other technical objectives than predicting customer churn. In addition, the above-described process of creating a predictive model is exemplary only, and the implementation of the method of the present invention just relies on an existing predictive model but is not limited to any specific process of creating a predictive model.

After creating the predictive model, the created predictive model may be evaluated by using the method according to the embodiments of the present invention.

As shown in FIG. 2, first in step S201, features of training samples in a set of training samples are identified. The features of the training samples may comprise, for example, features indicating the type of a data mining task to which a training sample is directed, and features indicating the type of the training samples, etc. In one embodiment, the type of the data mining task to which the training samples are directed is first identified, and then the type of the training samples for which the type of the directed data mining task has been identified is identified. Types of the training samples comprise static, time series, etc. For example, a timestamp in the set of training samples may indicate training samples are of a type of time series, while the absence of a timestamp in the set of training samples may indicate training samples are static samples. In addition, types of data mining tasks usually comprise classification tasks (including bi-classification tasks and multi-classification tasks), clustering tasks, estimation tasks, etc. The type of the data mining task to which training samples are directed may be indicated by the presence or absence of a label. For example, if the set of training samples contains a label, it indicates the type of the data mining task to which training samples are directed is a classification task.

Figure 8:
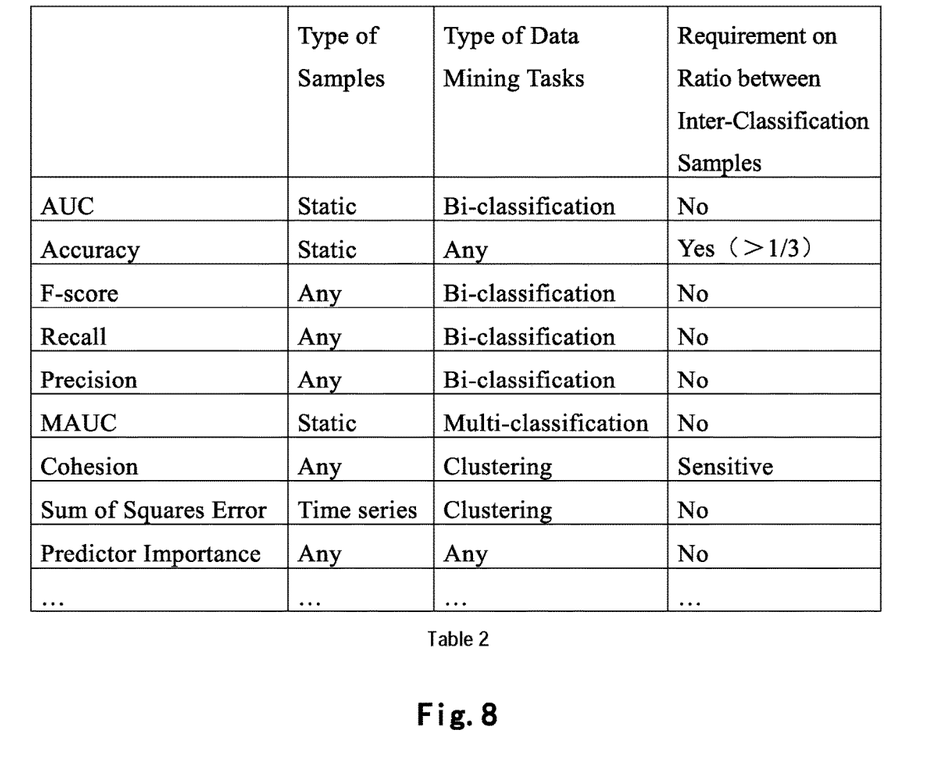
FIG. 8 depicts Table 2 showing an example of a set of evaluation metrics in an embodiment of the present invention.

In step S202, at least one evaluation metric may be selected from a set of evaluation metrics as one or more available metrics based on the identified features of the training samples. In one embodiment of the present invention, the set of evaluation metrics comprises a plurality of first elements, each of which comprises an evaluation metric and at least one attribute associated with the evaluation metric. The at least one attribute associated with the evaluation metric comprises, for example: a type of sample to which the evaluation metric is applicable, a type of a data mining task to which the evaluation metric is applicable, a requirement of the evaluation metric on the ratio between inter-classification samples, etc. Table 2 in FIG. 8 shows a specific example of the set of evaluation metrics.

It should be understood that Table 2 only lists a limited number of evaluation metrics but does not exhaust all evaluation metrics used for evaluating a predictive model. The set of evaluation metrics according to the embodiments of the present invention includes, but is not limited to the evaluation metrics listed in Table 2. In addition, Table 2 lists three attributes, i.e. a type of samples to which evaluation metrics are applicable, a type of the data mining task to which the evaluation metrics are applicable, and requirements of the evaluation metrics on the ratio between inter-classification samples. However, the set of the evaluation metrics according to the embodiments of the present invention is not limited thereto, but may contain more or less attributes. For example, the attribute such as requirement on the ratio between inter-classification samples (the 4th column) is optional.

In one embodiment, selecting at least one evaluation metric from a set of evaluation metrics as one or more available metrics comprises: comparing the identified features of the training samples with the at least one attribute of each evaluation metric in the set of evaluation metrics; and in response to the identified features of the training samples matching at least one attribute of at least one evaluation metric, selecting the at least one evaluation metric as the one or more available metric.

In one embodiment, where only the type of the data mining task to which the training samples are directed is identified, the identified type of the data mining task to which the training samples are directed is compared with the at least one attribute of each evaluation metric in the set of evaluation metrics; in response to the identified type of the data mining task to which the training samples are directed matching the type of the data mining task to which one or more evaluation metrics in the set of evaluation metrics are applicable, the one or more evaluation metrics are selected as the one or more available metrics.

In one embodiment, where the type of the data mining task to which the training samples are directed is first identified and the type of the training samples whose type of the data mining task has been identified is identified subsequently, both the identified type of the data mining task and the type of the training samples are compared with the at least one attribute of each evaluation metric in the set of evaluation metrics. In response to the type of the data mining task and the type of the training samples matching the type of the data mining task to which one or more evaluation metrics in the set of evaluation metrics are applicable and the type of samples to which the evaluation metrics are applicable, the one or more evaluation metrics are selected as the one or more available metric.

With continued reference to FIG. 2, in step S203, a predictive model created based on the set of training samples is applied to a set of test samples so as to calculate values of the available metrics. Hereinafter, with respect to the example of predicting telecommunications customer churn as shown in Table 1, by taking the calculation of a value of F-score, brief description is provided as to how to calculate values of the available metrics.

F-score may be given as below:

$$F\text{-score}=(2*\text{precision}*\text{recall})/(\text{precision}+\text{recall}) \quad \text{(Equation 1)}$$

$$\text{Precision}=TP/(TP+FP) \quad \text{(Equation 2)}$$

$$\text{Recall}=TP/(TP+FN) \quad \text{(Equation 3)}$$

where TP (True Positive) represents customers who will stop to use competitors' products and who are predicted precisely;

FP (False Positive) represents customers who will stop to use competitors' products and who are not predicted precisely;

FN (False Negative) represents customers who will continue using this company's products and who are not predicted precisely; and TN (True Negative) represents customers who will continue using this company's products and who are predicted precisely.

Figure 9:
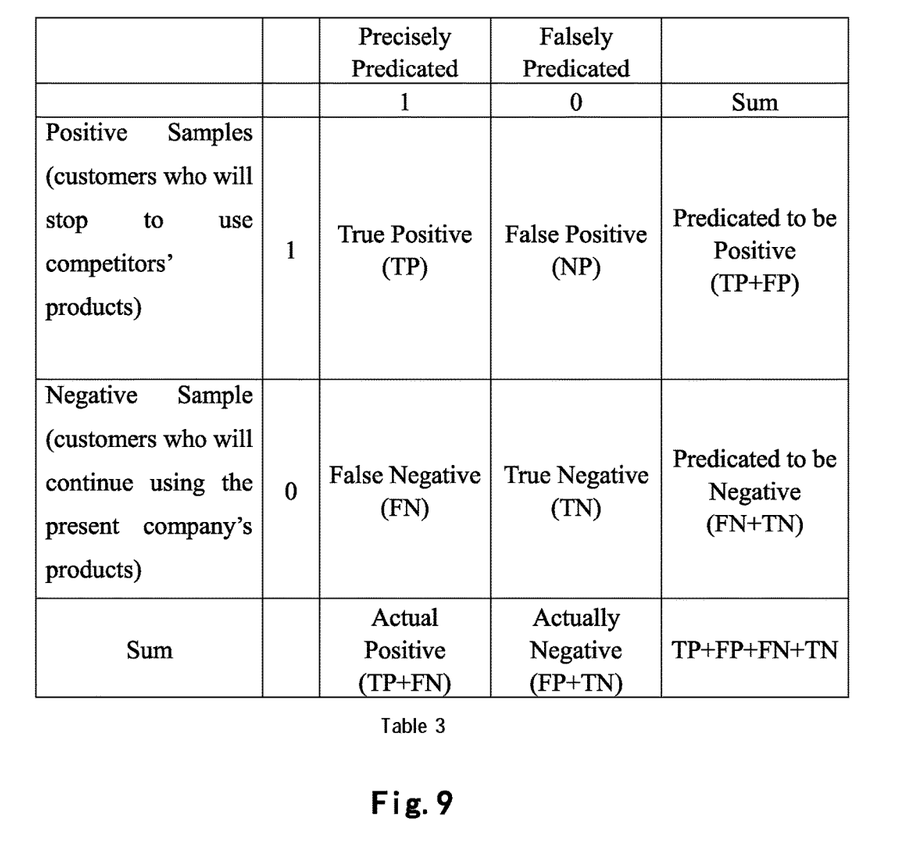
FIG. 9 depicts Table 3 showing an example of calculating values of available metrics according to an embodiment of the present invention.

A mapping table (Table 3) in FIG. 9 shows a prediction result obtained by applying the predictive model to the set of test samples. By making statistics on the prediction result, it is calculated from Equations 2 and 3 that Precision=0.75, Recall=0.79, and then it is calculated from Equation 3 that F-score=0.77.

In step S204, the predictive model is evaluated by using the available metrics and the values of the available metrics. As is well known to those skilled in the art, the process of evaluating the predictive model by using the available metrics and the values of the available metrics may be implemented on an existing data mining platform and thus the detailed description of the process is omitted.

Figure 3:
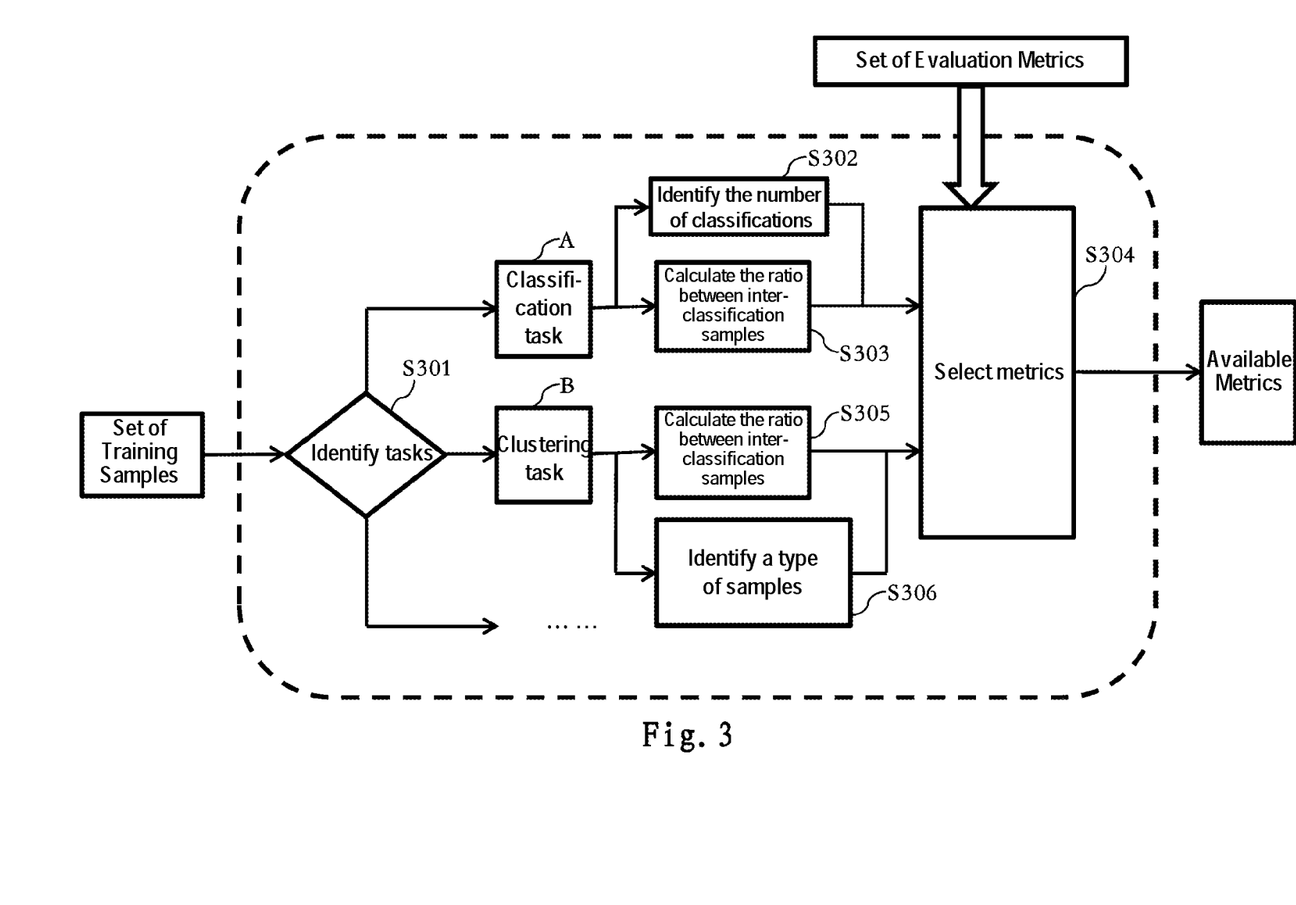
FIG. 3 schematically shows a flowchart of a process for identifying features of training samples and selecting available metrics from a set of evaluation metrics based on the identified features according to an embodiment of the present invention.

Hereinafter, with reference to Table 1, Table 2 and FIG. 3, there is presented description of a flowchart of analyzing training samples and selecting one or more available metrics from a set of evaluation metrics based on the analysis according to an embodiment of the present invention. In step S301, a type of a data mining task to which training samples in a set of training samples are directed is identified. For example, if it is identified that the set of training samples contains a label (e.g. as shown by Table 1), it is indicated the training samples are directed to a classification task (as shown by block A). If it is identified that the set of training samples contains no label, it is usually considered that the training samples are directed to a clustering task (as shown by block B). In step S302, the number of the classifications is identified. If a value of the label is 0 or 1, the number of the classifications may be identified as 2, i.e., the training sample is directed to a bi-classification task. For example, as shown by the last column in Table 1, the prediction result only comprises two classifications, i.e., churned and non-churned, so it may be determined that the training samples are directed to a bi-classification task. In step S303, the ratio between inter-classification samples is calculated. For example, in the example as shown by Table 1, it is calculated that the ratio of lost customers to non-lost customers is 1:9. Then, in step S304, one or more evaluation metrics, such as AUC, Accuracy, F-score, Recall and Precision, that are applicable to the bi-classification task are selected from the set of evaluation metrics as shown by Table 2 as one or more available metrics. While the number of classifications is identified in step S302, if the label has more than two values, the number of classifications is identified as more than 2, i.e., the training samples are directed to a multi-classification task. As a result, in step S304, one or more evaluation metrics, such as Accuracy and MAUC, which are applicable to the multi-classification task are selected from the set of evaluation metrics as shown in Table 2 as one or more available metrics.

While a type of a data mining task to which training samples in a set of training samples are directed is identified in step S301, if it is identified that the set of training samples contains no label, it is usually considered that the training samples are directed to a clustering task (as shown by block B). Then in step S305, the ratio between inter-classification samples is calculated. In step S306, a type of the training samples is identified. If the type of the training sample is identified as time series type, one or more evaluation metrics, such as Sum of Squares Error, that are applicable to the clustering task and to the training samples of the time series type are selected from the set of evaluation metrics as shown in Table 2 as one or more available metrics in step S304.

Figure 4:
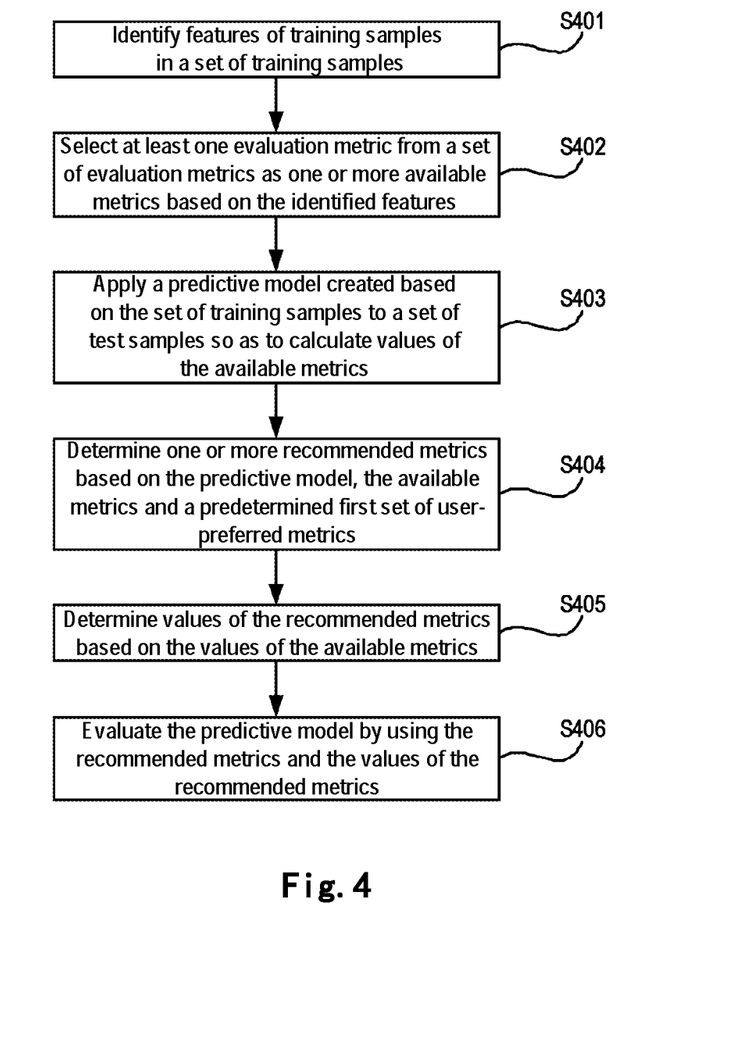
FIG. 4 schematically shows a flowchart of a method for evaluating a predictive model according to another embodiment of the present invention.
Figure 10:
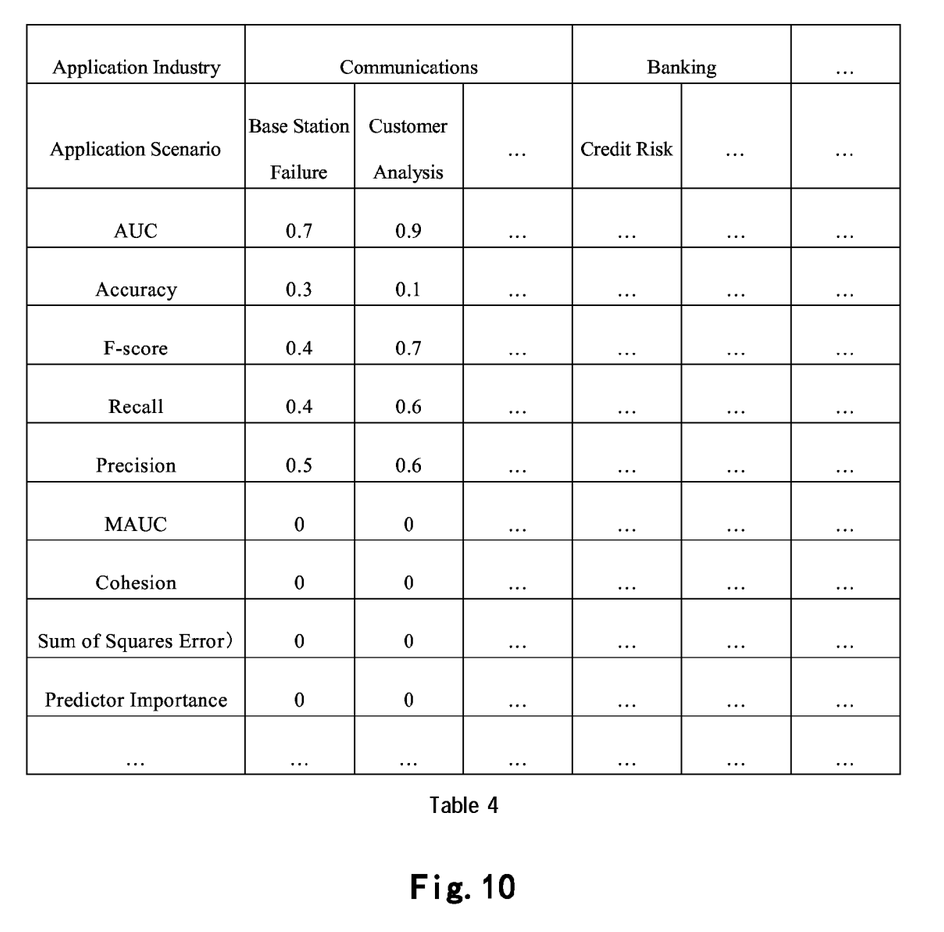
FIG. 10 depicts Table 4 showing an example of a first set of user-preferred metrics in an embodiment of the present invention.

FIG. 4 shows a flowchart of a method for evaluating a predictive model according to another embodiment of the present invention. Besides steps S401, S402 and S403 that are identical to steps S201, S202 and S203 in FIG. 2, the method as shown in FIG. 4 further comprises steps S404, S405 and S406. In step S404, one or more recommended metrics are determined based on the predictive model, the available metrics and a predetermined first set of user-preferred metrics. In one embodiment, the first set of user-preferred metrics comprises a plurality of second elements, each of which comprises a first user-preferred metric and at least one attribute associated with the first user-preferred metric. The first user-preferred metrics contained in the first set of user-preferred metrics may be identical to evaluation metrics contained in the set of evaluation metrics or comprise a subset thereof. The at least one attribute associated with the first user-preferred metric at least comprises an attribute indicating a degree of a user's preference to the first user-preferred metric, e.g. weight. Table 4 in FIG. 10 shows a specific example of the first set of user-preferred metrics.

The first set of user-preferred metrics as shown in Table 4 comprises a plurality of first user-preferred metrics, such as AUC, Accuracy, F-score, Recall, Precision, etc. Attributes associated with the first user-preferred metrics comprise an attribute indicating industries (e.g. communications, banking) to which the first user-preferred metrics are applied, an attribute indicating application scenarios (e.g. customer analysis, base station failure prediction in communications; credit risk prediction in banking) of the first user-preferred metrics in a specific industry, and a weight indicating the degree of the user's preference to a specific first user-preferred metric. The larger the weight is, the greater the degree of the user's preference to the metric would be. For example, in customer analysis scenarios in the communications industry, a weight of AUC is 0.9, while a weight of Accuracy is 0.1, which indicates that the user prefers to use AUC for evaluating the predictive model.

In the embodiments described above with reference to Table 1, Table 2 and FIG. 3, in order to evaluate the predictive model created based on the set of training samples in Table 1, five evaluation metrics are selected from the set of evaluation metrics in Table 2 as available metrics, i.e., AUC, Accuracy, F-score, Recall, and Precision. In an embodiment of the present invention, these available metrics may be further compared with first user-preferred metrics in the first set of user-preferred metrics in Table 4, and first user-preferred metrics matching these available metrics are selected from Table 4 as recommended metrics to be recommended to the user. Specifically, an industry (communications) to which the training samples as shown in Table 1 are applied is determined based on, for example, interaction with the user. Then, an application scenario (customer analysis) in the industry of the training samples as shown in Table 1 is determined based on the set of training samples, the analysis of the created predictive model and the interaction with the user. Subsequently, the available metrics AUC, Accuracy, F-score, Recall and Precision and the determined industry and application scenario to which the training samples are applied are compared with the first user-preferred metrics and the associated attributes (application industry, application scenario) as shown in Table 4, so as to select from Table 4 the first user-preferred metrics AUC, Accuracy, F-score, Recall and Precision matching the available metrics AUC, Accuracy, F-score, Recall and Precision as the recommended metrics.

In one embodiment, selecting one or more first user-preferred metrics matching the one or more available metrics from the first set of user-preferred metrics as the one or more recommended metrics comprises ranking the selected first user-preferred metrics by weight in response to a user input indicating a desired number of recommended metrics; and sequentially selecting the number of first user-preferred metrics from the ranked first user-preferred metrics as the one or more recommended metrics. For example, if the user inputs 4 as a desired number of the recommended metrics, in response to the user input, the first user-preferred metrics AUC, Accuracy, F-score, Recall and Precision selected from Table 4 are ranked in decreasing order by weight, and then the first 4 first user-preferred metrics AUC, F-score, Recall and Precision are used as the recommended metrics. Further, weights associated with the selected first user-preferred metrics may be determined as weights of the recommended metrics, and the recommended metrics are presented to the user in association with the weights of the recommended metrics.

Returning to FIG. 4, in step S405, values of the recommended metrics are determined based on the values of the available metrics. In other words, the values of the available metrics corresponding to the recommended metrics are determined as the values of the recommended metrics. In step S406, the predictive model is evaluated by using the recommended metrics and the values of the recommended metrics.

Figure 5:
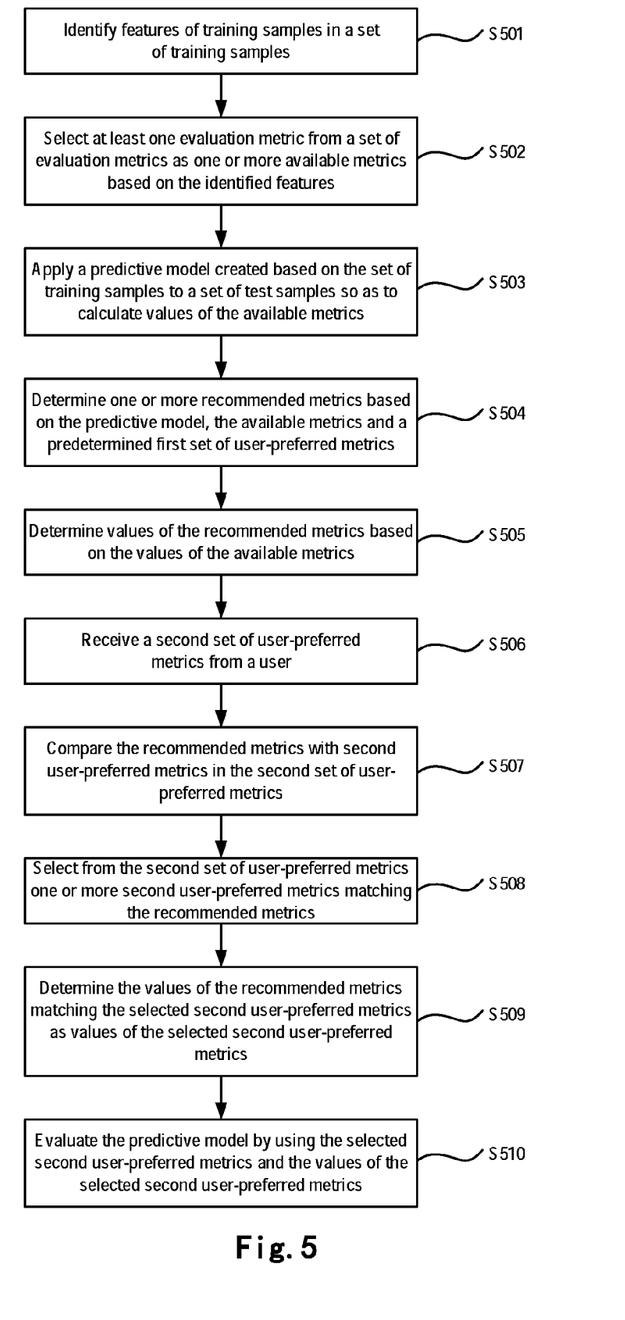
FIG. 5 schematically shows a flowchart of a method for evaluating a predictive model according to a further embodiment of the present invention.
Figure 11:
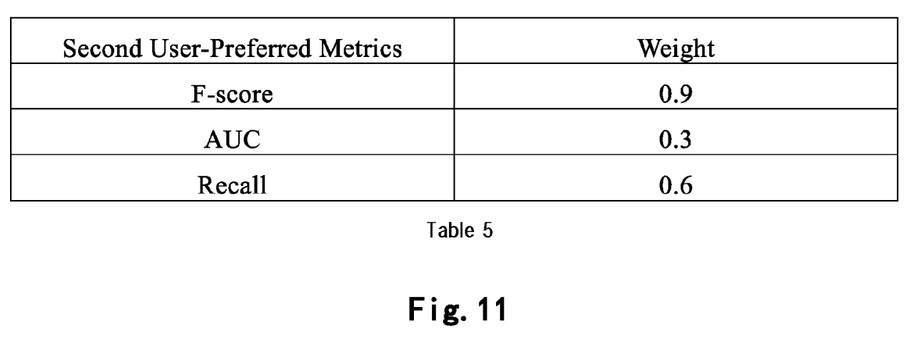
FIG. 11 depicts Table 5 showing an example of a second set of user-preferred metrics in an embodiment of the present invention.

FIG. 5 shows a flowchart of a method for evaluating a predictive model according to a further embodiment of the present invention. Besides steps S501, S502 and S503 that are identical to steps S201, S202 and S203 in FIG. 2, and steps S504 and S505 that are identical to steps S404 and S405 in FIG. 4, the method as shown in FIG. 5 further comprises steps S506 to S510. In step S506, a second set of user-preferred metrics is received from the user. In one embodiment, the second set of user-preferred metrics comprises a plurality of third elements, each of which at least comprises a second user-preferred metric and a weight associated with the second user-preferred metric. Second user-preferred metrics contained in the second set of user-preferred metrics may be a subset of the first user-preferred metrics contained in the first set of user-preferred metrics. Table 5 in FIG. 11 shows a specific example of the second set of user-preferred metrics.

In step S507, the recommended metrics are compared with second user-preferred metrics in the second set of user-preferred metrics. In step S508, one or more second user-preferred metrics matching the recommended metrics are selected from the second set of user-preferred metrics. In step S509, the values of the recommended metrics matching the selected second user-preferred metrics are determined as values of the selected second user-preferred metrics. In step S510, the predictive model is evaluated by using the selected user-preferred metrics and the values of the second user-preferred metrics. With continued reference to the example as described above, the recommended metrics AUC, F-score, Recall and Precision selected from Table 4 are compared with the second user-preferred metrics in Table 5, and then the second user-preferred metrics matching the recommended metrics AUC, F-score, Recall are selected from Table 5.

In one embodiment, the selected second user-preferred metrics are ranked by weight, and the ranked second user-preferred metrics are presented to the user in association with the weights of the second user-preferred metrics.

In one embodiment, the first set of user-preferred metrics is updated by using the second user-preferred metrics and weights of the second user-preferred metrics. The updating may be a heuristic progressive updating. For example, in the second set of user-preferred metrics as shown in Table 5, the weight 0.9 of F-score is larger than the weight 0.3 of AUC, which indicates that in customer analysis scenarios in the communications industry, users prefer to use F-score for evaluating predictive models. After receiving Table 5 from the user, weights of the metrics F-score, Recall and AUC in Table 4 may be modified according to a predetermined step size based on the metrics F-score, Recall and AUC as well as their associated weights in Table 5. For example, the weight of F-score in Table 4 is increased by 0.1, while the weight of AUC is decreased by 0.1, whereby Table 4 is updated. The updated Table 4 may be used subsequently.

Figure 6:
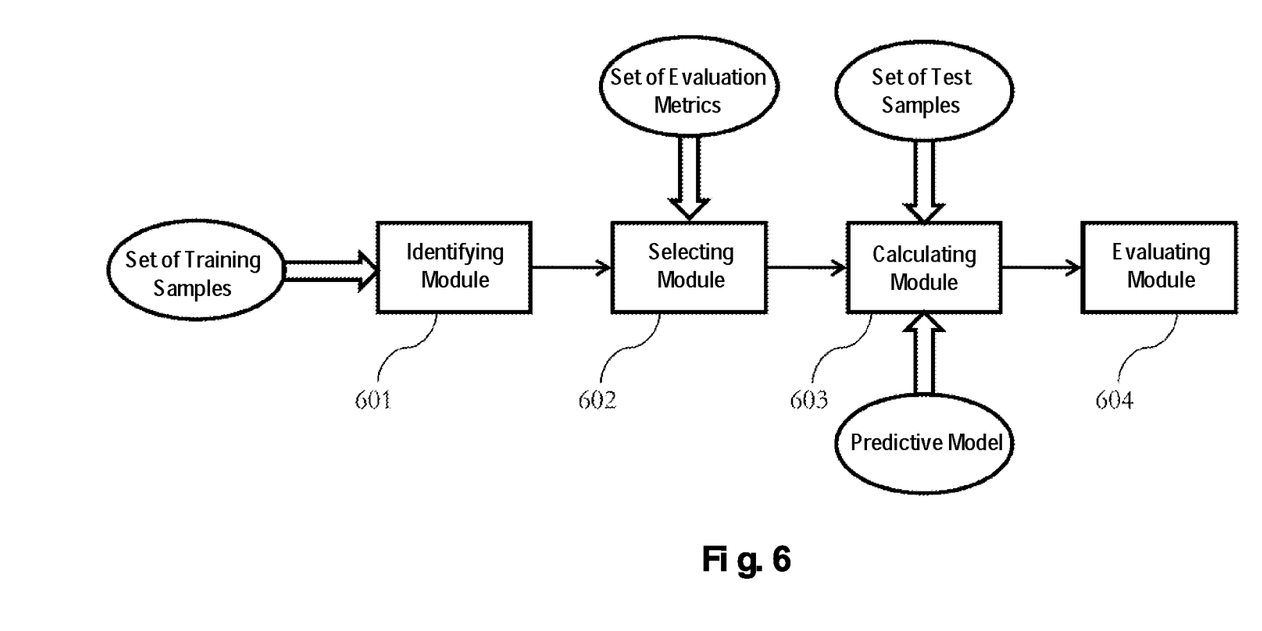
FIG. 6 schematically shows a block diagram of an apparatus for evaluating a predictive model according to an embodiment of the present invention.

In a second aspect, embodiments of the present invention provide an apparatus for evaluating a predictive model. FIG. 6 shows a block diagram of an apparatus for evaluating a predictive model according to an embodiment of the present invention. As shown in FIG. 6, the apparatus for evaluating a predictive model comprises: an identifying module 601 configured to identify features of the training samples in a set of training samples; a selecting module 602 configured to select at least one evaluation metric from a set of evaluation metrics as one or more available metrics based on the identified features; a calculating module 603 configured to apply a predictive model created based on the set of training samples to a set of test samples so as to calculate values of the available metrics; and an evaluating module 604 configured to evaluate the predictive model by using the available metrics and the values of the available metrics.

In an embodiment, the set of evaluation metrics comprises a plurality of first elements, each of which comprises an evaluation metric and at least one attribute associated with the evaluation metric.

In an embodiment, the selecting module 602 comprises: a first comparing unit configured to compare the identified features with the at least one attribute of each evaluation metric in the set of evaluation metrics; and a first selecting unit configured to, in response to the identified features matching at least one attribute of at least one evaluation metric, select the at least one evaluation metric as the available metrics.

In an embodiment, the at least one attribute associated with the evaluation metric at least comprises a type of samples to which the evaluation metric is applicable, and a type of a data mining task to which the evaluation metric is applicable.

In an embodiment, the identified features at least comprise a type of the training samples and a type of a data mining task to which the training samples are directed.

In an embodiment, the selecting module 602 comprises a first determining module configured to determine one or more recommended metrics based on the predictive model, the available metrics and a predetermined first set of user-preferred metrics; the calculating module 603 comprises a second determining module configured to determine values of the recommended metrics based on the values of the available metric; and the evaluating module 604 is further configured to evaluate the predictive model by using the recommended metrics and the values of the recommended metrics.

In an embodiment, the first set of user-preferred metrics comprises a plurality of second elements, each of which comprises a first user-preferred metric and at least one attribute associated with the first user-preferred metric, and wherein the at least one attribute associated with the first user-preferred metric at least comprises a weight indicating a degree of a user's preference to the first user-preferred metric.

In an embodiment, the first determining module comprises: a second comparing unit configured to compare the available metrics with first user-preferred metrics in the first set of user-preferred metrics; a second selecting unit configured to select one or more first user-preferred metrics matching the available metrics from the first set of user-preferred metrics; a first ranking unit configured to, in response to a user's input indicating a desired number of the recommended metrics, rank the selected first user-preferred metrics by weight; and a sequentially selecting unit configured to sequentially select the desired number of the first user-preferred metrics as the one or more recommended metrics from the ranked first user-preferred metrics.

In an embodiment, the first determining module further comprises: a receiving module configured to receive a second set of user-preferred metrics from a user; a comparing module configured to compare the recommended metrics with second user-preferred metrics in the second set of user-preferred metrics; and a user-preferred metric selecting module configured to select one or more second user-preferred metrics matching the recommended metrics from the second set of user-preferred metrics. In this embodiment, the second determining module is further configured to determine the values of the recommended metrics matching the selected second user-preferred metrics as values of the selected second user-preferred metrics, and the evaluating module is further configured to evaluate the predictive model by using the selected second user-preferred metrics and the values of the selected second user-preferred metrics.

In an embodiment, the second set of user-preferred metrics comprises a plurality of third elements, each of which at least comprises a second user-preferred metric and a weight associated with the second user-preferred metric.

In an embodiment, the apparatus further comprising: an updating module configured to update the first set of user-preferred metrics by using the second user-preferred metrics and the weights of the second user-preferred metrics.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for evaluating a predictive model, comprising:
   identifying, by one or more computer processors, features of training samples in a set of training samples, wherein the identified features at least comprise a type of the training samples and a type of a data mining task to which the training samples are directed;
   selecting, by one or more computer processors, at least one evaluation metric from a set of evaluation metrics as one or more available metrics based on the identified features;
   applying, by one or more computer processors, a predictive model created based on the set of training samples to a set of test samples so as to calculate values of the one or more available metrics; and
   evaluating, by one or more computer processors, the predictive model by using the one or more available metrics and the values of the one or more available metrics.

2. The method according to claim 1, wherein the set of evaluation metrics comprises a plurality of first elements, each of which comprises an evaluation metric and at least one attribute associated with the evaluation metric.

3. The method according to claim 2, wherein selecting, by one or more computer processors, at least one evaluation metric from a set of evaluation metrics as one or more available metrics based on the identified features comprises:
   comparing, by one or more computer processors, the identified features with the at least one attribute of each evaluation metric in the set of evaluation metrics; and
   in response to the identified features matching at least one attribute of at least one evaluation metric in the set of evaluation metrics, selecting, by one or more computer processors, the at least one evaluation metric as the one or more available metrics.

4. The method according to claim 2, wherein the at least one attribute associated with the evaluation metric at least comprises a type of samples to which the evaluation metric is applicable, and a type of a data mining task to which the evaluation metric is applicable.

5. The method according to claim 1, wherein selecting, by one or more computer processors, at least one evaluation metric from a set of evaluation metrics as one or more available metrics comprises:
   determining, by one or more computer processors, one or more recommended metrics based on the predictive model, the one or more available metrics and a predetermined first set of user-preferred metrics;
   wherein applying, by one or more computer processors, a predictive model created based on the set of training samples to a set of test samples so as to calculate values of the one or more available metrics comprises determining values of the one or more recommended metrics based on the values of the available metric; and
   wherein evaluating, by one or more computer processors, the predictive model comprises evaluating the predictive model by using the one or more recommended metrics and the values of the one or more recommended metrics.

6. The method according to claim 5, wherein the predetermined first set of user-preferred metrics comprises a plurality of second elements, each of which comprises a first user-preferred metric and at least one attribute associated with the first user-preferred metric, and wherein the at least one attribute associated with the first user-preferred metric at least comprises a weight indicating a degree of a user's preference to the first user-preferred metric.

7. The method according to claim 6, wherein determining, by one or more computer processors, one or more recommended metrics comprises:
   comparing, by one or more computer processors, the one or more available metrics with first user-preferred metrics in the predetermined first set of user-preferred metrics;
   selecting, by one or more computer processors, one or more first user-preferred metrics matching the one or more available metrics from the first set of user-preferred metrics;
   in response to a user's input indicating a desired number of the one or more recommended metrics, ranking, by one or more computer processors, the selected one or more first user-preferred metrics by weight; and
   sequentially selecting, by one or more computer processors, the desired number of the one or more first user-preferred metrics as the one or more recommended metrics from the ranked one or more first user-preferred metrics.

8. The method according to claim 5, wherein determining one or more recommended metrics further comprises:
   receiving, by one or more computer processors, a second set of user-preferred metrics from a user;

comparing, by one or more computer processors, the one or more recommended metrics with second user-preferred metrics in the second set of user-preferred metrics; and selecting, by one or more computer processors, one or more second user-preferred metrics matching the one or more recommended metrics from the second set of user-preferred metrics;

wherein determining values of the one or more recommended metrics comprises:

determining, by one or more computer processors, the values of the one or more recommended metrics matching the selected second user-preferred metrics as values of the selected second user-preferred metrics, and wherein evaluating, by one or more computer processors, the predictive model comprises:

evaluating, by one or more computer processors, the predictive model by using the selected second user-preferred metrics and the values of the selected second user-preferred metrics.

9. The method according to claim 8, wherein the second set of user-preferred metrics comprises a plurality of third elements, each of which at least comprises a second user-preferred metric and a weight associated with the second user-preferred metric.

10. The method according to claim 9, further comprising:
updating, by one or more computer processors, the first set of user-preferred metrics by using the second user-preferred metrics and the weight of the second user-preferred metric.

11. An apparatus for evaluating a predictive model, the apparatus comprising:
one or more computer processors;
one or more computer readable storage media;
program instructions stored on the one or more computer readable storage media for execution by at least one of the one or more computer processors, the program instructions comprising:
an identifying module configured to identify features of training samples in a set of training samples, wherein the identified features at least comprise a type of the training samples and a type of a data mining task to which the training samples are directed;
a selecting module configured to select at least one evaluation metric from a set of evaluation metrics as one or more available metrics based on the identified features;
a calculating module configured to apply a predictive model created based on the set of training samples to a set of test samples so as to calculate values of the one or more available metrics; and
an evaluating module configured to evaluate the predictive model by using the one or more available metrics and the values of the one or more available metrics.

12. The apparatus according to claim 11, wherein the set of evaluation metrics comprises a plurality of first elements, each of which comprises an evaluation metric and at least one attribute associated with the evaluation metric.

13. The apparatus according to claim 12, wherein the selecting module comprises:
a first comparing unit configured to compare the identified features with the at least one attribute of each evaluation metric in the set of evaluation metrics; and
a first selecting unit configured to, in response to the identified features matching at least one attribute of at least one evaluation metric, select the at least one evaluation metric as the one or more available metrics.

14. The apparatus according to claim 12, wherein the at least one attribute associated with the evaluation metric at least comprises a type of samples to which the evaluation metric is applicable, and a type of a data mining task to which the evaluation metric is applicable.

15. The apparatus according to claim 11, wherein the selecting module comprises a first determining module configured to determine one or more recommended metrics based on the predictive model, the one or more available metrics and a predetermined first set of user-preferred metrics;

wherein the calculating module comprises a second determining module configured to determine values of the one or more recommended metrics based on the values of the available metric; and wherein the evaluating module is further configured to evaluate the predictive model by using the one or more recommended metrics and the values of the recommended metrics.

16. The apparatus according to claim 15, wherein the predetermined first set of user-preferred metrics comprises a plurality of second elements, each of which comprises a first user-preferred metric and at least one attribute associated with the first user-preferred metric, and wherein the at least one attribute associated with the first user-preferred metric at least comprises a weight indicating a degree of a user's preference to the first user-preferred metric.

17. The apparatus according to claim 16, wherein the first determining module comprises:
a second comparing unit configured to compare the one or more available metrics with first user-preferred metrics in the first set of user-preferred metrics;
a second selecting unit configured to select one or more first user-preferred metrics matching the one or more available metrics from the first set of user-preferred metrics;
a first ranking unit configured to, in response to a user's input indicating a desired number of the one or more recommended metrics, rank the selected first user-preferred metrics by weight; and
a sequentially selecting unit configured to sequentially select the desired number of the first user-preferred metrics as the one or more recommended metrics from the ranked first user-preferred metrics.

18. The apparatus according to claim 15, wherein the first determining module further comprises:
a receiving module configured to receive a second set of user-preferred metrics from a user;
a comparing module configured to compare the one or more recommended metrics with second user-preferred metrics in the second set of user-preferred metrics; and
a user-preferred metric selecting module configured to select one or more second user-preferred metrics matching the one or more recommended metrics from the second set of user-preferred metrics;
wherein the second determining module is further configured to determine the values of the recommended metrics matching the selected second user-preferred metrics as values of the selected second user-preferred metrics, and
wherein the evaluating module is further configured to evaluate the predictive model by using the selected second user-preferred metrics and the values of the selected second user-preferred metrics.

* * * * *